United States Patent Office 3,825,662
Patented July 23, 1974

3,825,662
METHOD FOR COMBATING CERTAIN FOLIAR DISEASES OF PLANTS
Roger Paul Cahoy, Overland Park, Kans., assignor to Gulf Research & Development Company, Pittsburgh, Pa.
No Drawing. Filed Oct. 18, 1971, Ser. No. 190,395
Int. Cl. A01n 9/20
U.S. Cl. 424—300
2 Claims

ABSTRACT OF THE DISCLOSURE

Fungus and bacterial foliar diseases of plants are combated by applying to the plants an effective but substantially non-phytotoxic amount of a compound having the structural formula

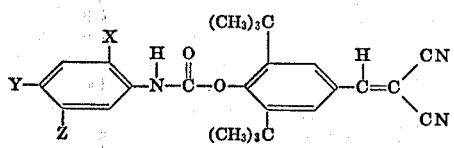

in which X is selected from the group consisting of hydrogen and chloro and nitro substituents, Y is selected from the group consisting of hydrogen and chloro and fluoro substituents, and Z is selected from the group consisting of hydrogen and chloro substituents, at least one of X, Y and Z being hydrogen.

DESCRIPTION OF THE INVENTION

It has been recently discovered that certain benzylidenemalononitrile compounds are highly toxic to many different species of living organisms. One of these compounds, 3,5-di-*tert*.butyl - 4 - hydroxybenzylidenemalononitrile has recently been found to be an effective and chemically stable fungicide. (U.S. Pat. 3,538,226). This compound and its method of synthesis are both reported in *Ann.* vol. 645, p. 53–65 (1961). This compound unfortunately possesses the same disadvantage as some other highly effective fungicides; that is, a high level of toxicity to warm blooded animals, including humans. It has now been discovered that carbamyl derivatives of this compound having considerably higher molecular weights, which would therefore appear to dilute the toxic structure on a weight basis, possess both the advantages of high fungicidal and bactericidal activity and reduced toxicity both to plants and warm blooded animals. The method of preparation of representative compounds is illustrated in the procedures which appear below:

Preparation of 3,5-di-*tert*.butyl-4-(2,4-dichlorophenylcarbamyloxy) benzylidenemalononitrile A reaction flask was charged with 8.5 g. (0.03 mol) of 3,5-di-*tert*.butyl-4-hydroxybenzylidenemalononitrile, 7.0 g. (0.037 mol) of 2,4-dichlorophenyl isocyanate, 10 ml. of heptane and one drop of triethylamine. The reactants were mixed by hand stirring and heated on a water bath at 50–55° C. Within several minutes, an exothermic reaction took place and the reaction temperature reached 70° C. The reaction mixture was cooled, additional heptane was added and stirring was continued. The material was collected on a vacuum filter and air dried. It melted at 85–90° C.

*Analysis.*—Calcd. for $C_{25}H_{25}Cl_2N_3O_2$: C, 63.83; H, 5.36; N, 8.93. Found: C, 63.33; H, 5.58; N, 8.77.

Preparation of 2,6-di-*tert*.butyl-4-(2,2-dicyanovinyl) phenyl N-chloroacetylcarbamate Chloroacetyl isocyanate was prepared from chloroacetamide and oxalyl chloride as described in *Organic Synthesis*, vol. 46, p. 16 (1966). A reaction flask was charged with 8.6 g. (0.031 mol) of 3,5-di-*tert*.butyl-4-hydroxybenzylidenemalononitrile, a catalytic quantity of 1,4-diazobicyclo-[2.2.2] octane, 50 ml. benzene and 4.2 g. (0.035 mol) of chloroacetyl isocyanate. The reaction solution was stirred for six days at ambient temperature under a nitrogen atmosphere. After cooling, a white crystalline material precipitated which was collected on a vacuum filter. The compound was recrystallized from benzene-heptane. It melted at 160–4° C.

*Analysis.*—Calcd. for $C_{21}H_{24}ClN_3O_3$: C, 62.76; H, 6.02; N, 10.46. Found: C, 61.94; H, 5.95; N, 10.62.

Preparation of 3,5-di-*tert*.butyl-4-(4-chloro-2-nitrophenylcarbamyloxy) benzylidenemalononitrile A reaction flask was charged with 5.6 g. (0.02 mol) of 3,5 - di-*tert*.butyl - 4 - hydroxybenzylidenemalononitrile, 2 drops of triethylamine, 50 ml. of benzene and 6.0 g. (0.03 mol) of commercially available 4-chloro-2-nitrophenyl isocyanate. The reaction solution was stirred for 12 hours at ambient temperature. The solvent was removed on the rotary evaporator and the residue was stirred with hexane. The compound was collected on a vacuum filter and air dried. It melted at 143–46° C.

*Analysis.*—Calcd. for $C_{25}H_{25}ClN_4O_4$: C, 62.43; H, 5.24; N, 11.65. Found: C, 62.46; H, 5.50; N, 11.79.

The melting points of other compounds appearing in the fungicidal test data of this application are indicated:

| Chemical | Melting point, °C. | LD₅₀ (oral) mg./kg. body wt. |
|---|---|---|
| 3,5-di-*tert*. butyl-4-hydroxybenzylidenemalononitrile. | 138–41 | 6.5 to 28. |
| 3,5-di-*tert*.butyl-4-(2,5-dichlorophenylcarbamyloxy)benzylidenemalononitrile. | 141–43 | |
| 3,5-di-*tert*.butyl-4-(3,4-dichlorophenylcarbamyloxy)benzylidenemalononitrile. | 145–48 | |
| 3,5-di-*tert*.butyl-4-(4-chlorophnylcarbamyloxy)benzylidenemalononitrile. | 130–33 | |
| 3,5-di-*tert*.butyl-4-(phenylcarbamyloxy) benzylidenemalononitrile. | 135–38 | 25.7 to 48.7. |
| 3,5-di-*tert*.butyl-4-(3-chloro-4-fluorophenylcarbamyloxy)benzylidenemalononitrile. | 98–100 | |

Foliar Fungicide Test Procedure for Powdery Mildew Spore Control on Cucumbers (PMC)

Test chemicals (20 percent active samples) formulated in 0.05 percent MC–1500 methyl cellulose were applied to cucumber cotylendons using a pneumatic atomizing nozzle. After the spray was dry, the plants were placed in an inoculation chamber and dusted with powdery mildew spores. The plants were maintained at a relative humidity of 90–100 percent for 48 hours and then moved into the greenhouse. Results were determined after 10 days.

Foliar Fungicide Test Procedure For Leaf Rust Spore Control on Wheat (LRW)

Cheyenne wheat plants, *Triticum vulgare*, approximately seven to eight days old and four to five inches tall are mounted on a compound turntable and sprayed at 40 pounds pressure for 60 seconds with respective candidate compounds at concentrations indicated. Candidate compounds are prepared for spraying by dissolving in a suitable solvent system and diluting to desired concentration with deionized water containing wetting and dispersing agents.

After drying, treated plants are dusted with spores of *Puccinia rubigovera* directly from diseased plants and then immediately placed in an incubation chamber maintained at 70° F. and 95% plus RH. After the proper incubation period, plants are removed to the greenhouse for disease development.

Disease severity (infection pressure) is determined by actual count of developed pustules on inoculated but otherwise untreated controls. Control effectiveness is determined by actual count of the number of developed pustules appearing in the respective treatments compared directly to equivalent developed pustules developing on inoculated but otherwise untreated controls. Maneb is used as a reference standard. All units of test include a minimum of three replicates.

Foliar Fungicide Test Procedure for Apple Scab Spore Control on Apples (ASB)

McIntosh apple seedlings in vigorous growing condition, eight to ten inches tall, are mounted on a compound turntable and sprayed at 30 pounds pressure with the candidate compound at concentration indicated. Samples are prepared for spraying by dissolving in a suitable solvent (acetone, methyl alcohol, ethyl alcohol or other) and diluting to desired concentrations with deionized water containing wetting and dispersing agents.

After drying, treated plants are spray-inoculated with a spore suspension of *Venturia inaequalis* and immediately placed in an incubation chamber maintained at 70° F. and 95% plus RH. After 40 hours in the incubation chamber plants are removed to the greenhouse for further disease development. Fourteen days after inoculation plants are observed for disease development and control by counting the number of infection loci on the three most heavily infected leaves per plant. Efectiveness of treatments is determined by direct comparison with inoculated controls. Cyprex is used as a reference standard. All units of test include a minimum of three replicates.

Foliar Fungicide Test Procedure for Rice Blast Spore Control on Rice (RBD)

Rice plants in fully developed second-leaf growth stage are mounted on a compound turntable and sprayed at 40 pounds pressure for 60 seconds with the candidate compound at concentrations indicated. Approximately 150 ml. of test solution are delivered. Candidate samples are prepared for spraying by dissolving in a suitable solvent (acetone, methyl alcohol, ethyl alcohol or other) and diluting to desired concentration with deionized water containing wetting and dispersing agents.

After drying, treated plants are spray-inoculated at 30 pounds pressure with an aqueous spore suspension of *Piricularia oryzae* and then immediately placed in an incubation chamber maintained at 70° F. and 95% plus RH. After proper incubation time plants are removed to the greenhouse for disease development. Infection lesions are sufficiently developed within five days after inoculation to permit assessment of control. Disease severity is determined by actual count of the number of infection lesions developing on untreated inoculated controls. Effectiveness of treatment is determined by direct comparison of the number of infection lesions appearing on the respective treated plants compared directly with those lesions appearing on untreated inoculated controls. Phenylmercuric acetate is used as a reference standard. All units of test include a minimum of three replicates.

Foliar Application Procedure For Bacterial Leaf Spot Spore on Tomatoes (BLT)

Bonny Best tomato plants approximately six to seven weeks old, in six to seven-leaf growth stage, are mounted on a compound turntable and sprayed at 35 pounds pressure for 50 seconds with the candidate compound at concentrations indicated. Approximately 150 ml. of test solution is delivered. Candidate samples are prepared for spraying by dissolving in a suitable solvent (acetone, methyl alcohol, ethyl alcohol or other) and diluting to desired concentration with deionized water containing wetting and dispersing agents.

After drying, treated plants are spray-inoculated at 30 pounds pressure with an aqueous cell suspension of *Xanthomonas vesicatoria* containing five percent Carborundum and then immediately placed in an incubation chamber maintained at 70° F. and 95% plus RH. After 40 hours in the incubation chamber, plants are removed to the greenhouse for further development of infection lesions. Disease severity is determined by count of lesions present on six to seven treated leaves. Effectiveness of treatment is determined by direct comparison with inoculated controls. Streptomycin sulfate is used as a reference standard.

Disease control (PMC, LRW, ASB, RBD, BLT) and phytotoxicity were determined using the following scale:

Disease Control (percent)

0 = no control
1 = 0–25
2 = 26–75
3 = 76–99
4 = complete control

Phytotoxicity

A = no effect
B = some effect
C = medium effect
D = severe effect
E = dead plants

| Chemical | Concn. (P.p.m.) | PMC | LRW | ASB | RBD | BLT |
|---|---|---|---|---|---|---|
| (CH₃)₃C–C₆H₂(OH)(C(CH₃)₃)–CH=C(CN)₂ | 250 | 4-D | 4-A | 4-A | | -E |
| | 100 | 3-C | 4-A | 4-A | | -E |
| | 50 | 2-B | 4-A | | | 3-A |
| | 25 | 0-A | 3-A | | | 3-A |
| | 10 | 0-A | 3-A | | | 0-A |
| Cl₂C₆H₃–NHCO–O–C₆H₂(C(CH₃)₃)₂–CH=C(CN)₂ | 300 | 4-B | | | | |
| | 250 | | 4-A | 4-A | 3-A | -E |
| | 100 | 4-B | 4-A | 4-A | 3-A | -E |
| | 50 | | 4-A | | | 3-A |
| | 25 | 2-B | 3-A | | | 3-A |
| ClCH₂C(O)NHC(O)–O–C₆H₂(C(CH₃)₃)₂–CH=C(CN)₂ | 100 | | 3-A | 3-A | 3-A | 0-A |
| Cl₂C₆H₃–NHCO–O–C₆H₂(C(CH₃)₃)₂–CH=C(CN)₂ | 300 | 4-C | 3-A | | 3-D | 0-A |

TABLE—Continued

| Chemical | Concn. (P.p.m.) | Disease control | | | | |
|---|---|---|---|---|---|---|
| | | PMC | LRW | ASB | RBD | BLT |
| [Cl, Cl-phenyl-NHCO-O-(tBu)₂-phenyl-CH=C(CN)₂] | 300 | | 3-A | | 3-A | 0-A |
| [Cl-phenyl-NHCO-O-(tBu)₂-phenyl-CH=C(CN)₂] | 300 | | 3-A | | 3-A | 2-A |
| [phenyl-NHCO-O-(tBu)₂-phenyl-CH=C(CN)₂] | 300 | 3-A | 0-A | | 3-A | 0-A |
| [Cl, NO₂-phenyl-NHCO-O-(tBu)₂-phenyl-CH=C(CN)₂] | 100 | 0-D | 0-A | 4-A | 0-A | 0-A |
| [F, Cl-phenyl-NHCO-O-(tBu)₂-phenyl-CH=C(CN)₂] | 300 | 0-A | 3-A | | 3-A | 0-C |

The preferred compound to use in a composition for combating plant diseases is 3,5 - di - tert.butyl - 4- (2,4 - dichlorophenylcarbamyloxy)benzylidenemalononitrile. Customarily such compositions are formulated with finely divided inert solid diluents and surface active agents to yield wettable powders for use in aqueous sprays. A wettable powder containing the preferred compound may be prepared according to known techniques, using common diluents such as clays and diatomaceous earth, along with readily available wetting and dispersing agents. Suitable compositions for combating plant diseases may also be prepared in the form of dusts and water dispersible pastes, using suitable solid diluents, solvents and thickening agents. The preferred compound, though higher in molecular weight than 3,5-di-tert.butyl - 4 - hydroxybenzylidenemalononitrile, is more effective against some pathogenic organisms and at the same time is less toxic to sensitive plant species such as melons and cucumbers. The preferred compound is particularly useful in combating diseases of fruit trees such as, for example, apple scab and fire blight of pears.

I claim:
1. A method of controlling leaf rust spore on wheat plants comprising applying to said plants a fungicidally effective, but substantially non-phytotoxic, amount of 3,5-di-*tert*. butyl - 4-(2,4-dichlorophenylcarbamyloxy)benzylidenemalononitrile.
2. A method of controlling bacterial leaf spot spore on tomatoe plants comprising applying to said plants a bactericidally effective, but substantially non-phytotoxic, amount of 3,5-di-*tert*. butyl - 4 - (2,4-dichlorophenylcarbamyloxy) benzylidenemalononitrile.

References Cited
UNITED STATES PATENTS
3,694,483  9/1972  Cahoy et al. _____ 260—465 D
3,538,226  11/1970  Ozaki et al. _____ 424—304
3,592,912  7/1971  Ishiyama et al. _____ 424—304

ALBERT T. MEYERS, Primary Examiner

L. SCHENKMAN, Assistant Examiner